United States Patent [19]

Russell et al.

[11] 4,433,942
[45] Feb. 28, 1984

[54] WHARF FENDER

[75] Inventors: Graeme E. Russell, Bridgeman Downs; Brian S. Smith, Wavell Heights, both of Australia

[73] Assignee: Queensland Rubber Company Pty. Ltd., Australia

[21] Appl. No.: 299,680

[22] Filed: Sep. 8, 1981

[30] Foreign Application Priority Data

Sep. 25, 1980 [AU] Australia .............................. PE5755

[51] Int. Cl.³ .......................... E02B 3/22; B63B 59/02
[52] U.S. Cl. ................................... 405/215; 114/219; 267/140
[58] Field of Search ....................... 405/211, 212, 215; 14/76; 114/219; 293/136; 267/140, 153

[56] References Cited

U.S. PATENT DOCUMENTS

| | | | |
|---|---|---|---|
| 3,708,988 | 1/1973 | Miura | 405/215 |
| 3,788,082 | 1/1974 | Narabu | 405/215 |
| 3,999,497 | 12/1976 | Hamel | 405/212 X |
| 4,267,792 | 5/1981 | Kimura et al. | 405/215 X |
| 4,277,055 | 7/1981 | Yamaguchi et al. | 114/219 X |
| 4,319,539 | 3/1982 | Fujii et al. | 405/215 X |

*Primary Examiner*—David H. Corbin
*Assistant Examiner*—Nancy J. Pistel
*Attorney, Agent, or Firm*—Maky, Renner, Otto & Boisselle

[57] ABSTRACT

This invention relates to a Wharf fender assembly for use with wharves or docks made generally from resiliently deformable material.

The Wharf Fender assembly includes an elongate tubular bender body attachable to adjacent wharf which is generally progressively increasing width or transverse dimensions from one end to the other end thereby providing a larger end and a smaller end. There is also included buffer means operatively associated with the fender body which may withstand an impact from a ship or other vessel when the fender body is attached to the wharf. The invention also includes within its scope a fender body per se.

16 Claims, 6 Drawing Figures

WHARF FENDER

This invention relates to a wharf fender assembly for use with wharves or docks made generally from resiliently deformable material such as rubber or a synthetic resin or elastomer.

Conventional wharf fenders usually comprise a frontal plate and one or more fender bodies interposed between the frontal plate and the wharf or dock wall. The fender body in one conventional arrangement is usually cylindrical and is of tubular shape. These cylindrical fenders often known as cell type fenders are described in Australian Pat. No. 443,219 and while they have been found to be reasonably satisfactory in use it was often considered that their cylindrical shape was rather limited in relation to effective energy absorption and thus could have been more efficient.

It is an object of the invention to provide a wharf fender assembly which is efficient in operation and also provides more effective energy absorption than the conventional cell type fenders.

The wharf fender assembly of the invention includes an elongate tubular fender body attachable to an adjacent wharf which is of generally progressively increasing width or transverse dimensions from one end to the other end thereby providing a larger end and a smaller end, said fender body being formed from resiliently deformable material; and, buffer means operatively associated with the fender body which may withstand impact from a ship or other vessel when the fender body is attached to the wharf. The wharf fender may also include a rigid spacer preferably attached to the smaller end of the tubular body.

The fender body in its most preferred form is of frusto-conical shape. Thus the fender body may include opposed ends and a continuous side wall that has a uniform degree of outward taper from larger end to smaller end. However it is stressed that the degree of outward taper does not have to be uniform or that the side wall of the fender body be continuously circular in cross-section. In fact the fender body may be hexagonal or polygonal in cross-section. However, the circular cross-section is to be preferred.

The fender body may also have an attachment flange for attachment to an adjacent wharf wall and also may include one or more reinforcement plates if required. Suitably the smaller diameter end includes a reinforcement plate which assists in attachment to the rigid spacer.

The buffer plate may be of any appropriate shape and suitably includes an outer plate and an inwardly extending tubular portion which corresponds to the rigid spacer and which may be bolted directly to the reinforcement plate. A single buffer plate may be utilized which is attached to a plurality of fender bodies or a plurality of buffer plates may be utilized which are each attached to a supporting fender body.

The rigid spacer may, as described above, form an intergral part of the buffer plate or alternatively be separate from the buffer plate. The spacer is preferably tubular but this is not essential. It is preferred, however, that the spacer have the same diameter as the smaller end of the fender body.

Reference is now made to a preferred embodiment of the invention as shown in the attached drawings wherein.

Figure 1:
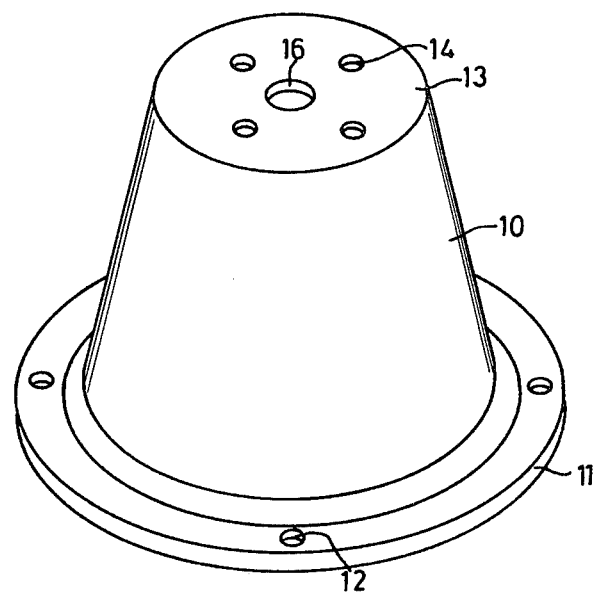
FIG. 1 is a perspective view of a fender body constructed in accordance with the invention.

In the drawings the fender body 10 includes attachment flange 11 for attachment to a wharf (not shown) which has attachment apertures 12. The smaller diameter end 13 of the frusto-conical fender body has attachment apertures 14 for attachment to a buffer plate 15. There is also provided a central aperture 16. The buffer plate 15 is provided with an inwardly extending portion 17 which is attached to smaller diameter end 13 of body 10. Portion 17 corresponds to the above mentioned rigid spacer and its function is clearly shown in FIG. 2 and FIG. 3 wherein it facilitates the fender body to achieve a state of maximum compression wherein the side wall in essence doubles back on itself as shown in FIG. 3. Spacer 17 is attached to reinforcement plate 18 by bolts 19 which extend through the flange 20. Bolts 21 may also extend through reinforcement plate 22 included in fender body 10 for attachment to the wharf wall.

Figure 2:
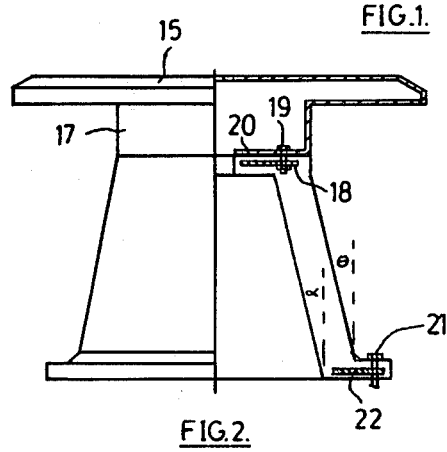
FIG. 2 is a part-sectional view of the fender body attached to a buffer plate.
Figure 3:
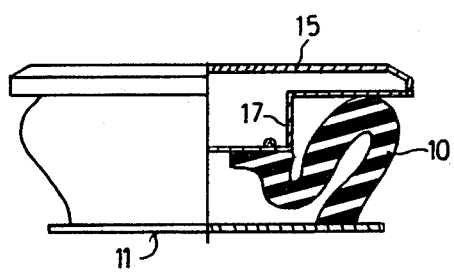
FIG. 3 is a part-sectional view of the fender body of FIG. 2 in a state of compression.

In FIG. 2 angle $\theta$ may suitably adopt a range of values between 5° and 20° and angle $\alpha$ may adopt a range of values between 5° and 25°.

Figure 5:
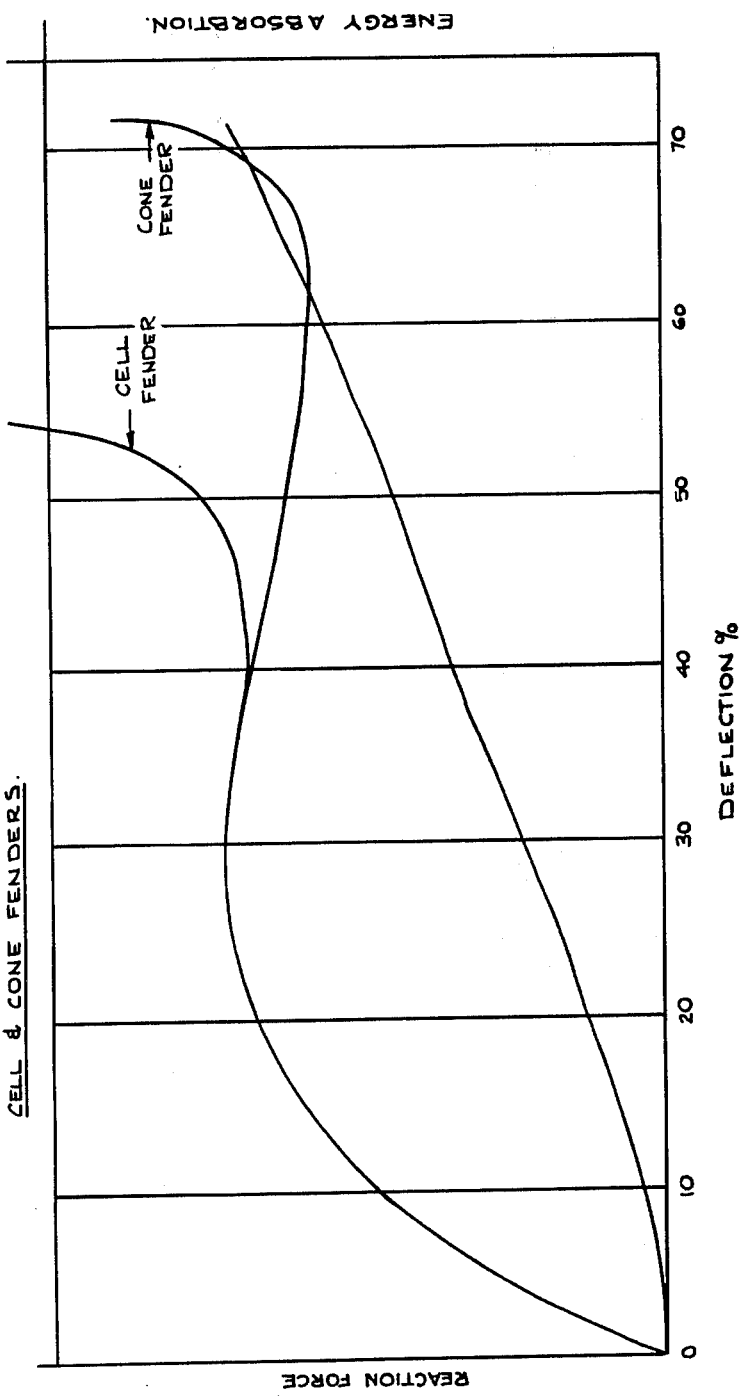

When compared to the conventional cell type fenders, the frusto-conical fender of the invention when loaded in the axial direction attains a greater energy absorption because the shape of the fender body allows for greater deflection. This clear from FIG. 5. This provides for the energy absorption/mass of the rubber to be higher than most types of fenders, and hence the fender body is more efficient in operation. For angular loading, a smaller reduction in energy absorption occurs than with cell type fenders and the fender of the invention is inherently stable.

The rigid spacer is advantageous in that it facilitates the attainment of a state of maximum compression of the frusto-conical shaped fender body. Thus it provides greater room or more accessible space for the fender body to buckle.

It will also be appreciated that the invention includes within its scope two fender bodies mounted in an end to end configuration where one fender body is attached to the wharf wall and the other fender body is attached to a buffer plate.

Figure 4:
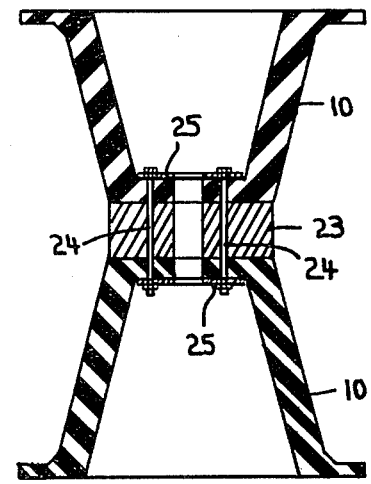
FIG. 4 is a sectional view of a wharf fender assembly constructed in accordance with the invention wherein opposed fender bodies as shown in FIG. 1 are mounted so that the mutually respective inner ends are located adjacent to each other.

As shown in FIG. 4, two adjacent fender bodies 10 are mounted with their smaller diameter ends adjacent each other and separated by rigid spacer plate 23. The assembly of FIG. 4 is shown interconnected by bolts 24 attached to reinforcement plates 25 located in each adjacent smaller diameter end of fender bodies 10.

Figure 6:
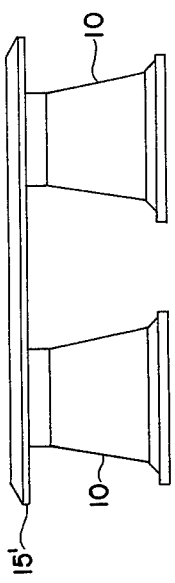
FIG. 5 is a graph showing the percentage deflection of the fender body of FIG. 1 varying with the reaction force applied and FIG. 6 is an elevational view of a single buffer plate attached to a plurality of fender bodies.

As shown in FIG. 6, a single or continuous buffer plate 15' may be attached to a plurality of fender bodies 10.

It also will be appreciated that the invention includes within its scope a fender body for connected to the above described buffer means and attachable to a wharf wall.

We claim:

1. A wharf fender assembly comprising: an elongate tubular fender body adapted for attaching to an adjacent wharf; said fender body having a circumferentially continuous sidewall and being of generally increasing width or transverse dimensions from one end to the other end thereby providing a larger end and a smaller end, said fender body being formed from resiliently deformable material; buffer means associated with the fender body for absorbing impact from a ship or other vessel when the fender body is attached to a wharf; and a rigid spacer attached to the fender body at the smaller end thereof which facilitates the attainment of a state of maximum compression of the fender body upon impact, said rigid spacer having an outer diameter about equal to or less than the inner diameter of said fender body at its larger end, whereby said rigid spacer may be collapsed to a point closely adjacent the wharf to attain maximum compression of said fender body upon impact.

2. A wharf fender assembly as claimed in claim 1 wherein the fender body includes an outer end of smaller transverse dimensions than an inner end located adjacent to a wharf in use, said outer end having attached thereto a rigid buffer plate constituting said buffer means.

3. A wharf fender assembly as claimed in claim 2 wherein the buffer plate is associated with said rigid spacer so as to space the buffer plate from the fender body.

4. A wharf fender assembly as claimed in claim 3 wherein the rigid spacer comprises a rigid inwardly extending portion of said buffer plate.

5. A wharf fender assembly as claimed in claims 1, 2, 3 or 4 wherein the fender body is substantially frusto-conical in shape.

6. A wharf fender assembly as claimed in claim 4 wherein the rigid inwardly extending portion of the buffer plate is attached to a reinforcement flange in the fender body.

7. A wharf fender assembly as claimed in claim 1 further including an attachment flange operatively associated with a reinforcement plate in the fender body wherein bolts or other fasteners may be passed through the reinforcement plate for direct attachment to the wharf.

8. A wharf fender assembly as claimed in claim 1 wherein the fender body includes a peripheral side wall wherein the outside surface of said wall has an angle to vertical of from 5° to 20° and the interior surface of said wall has an angle to vertical of 5° to 25°.

9. A wharf fender assembly as claimed in claim 2 wherein there is provided a single or continuous buffer plate which is attached to a plurality of said fender bodies which are attached to the wharf in use.

10. A wharf fender assembly as claimed in claim 1 wherein there are provided a pair of fender bodies mounted in an end to end configuration wherein the adjacent ends are the smaller ends of each fender body and a rigid spacer is interposed between said smaller ends having a diameter substantially equal to said smaller ends.

11. A wharf fender assembly as claimed in claims 1, 2, 3 or 4 wherein the fender body is substantially frusto conical in shape.

12. A fender assembly comprising: an elongate tubular fender body having an outer end, an inner end and a circumferentially continuous sidewall connecting said ends; said outer end having smaller transverse dimensions than said inner end; said inner end portion of the fender body adapted for attaching to a wharf; said outer end portion of the fender body adapted for attaching to a rigid spacer; said fender body being formed of resiliently deformable material; a rigid spacer having opposite each other, a fender side and a buffer side, said spacer adapted for attaching to said outer end of the fender body; buffer means for absorbing impact, said buffer means associated with said buffer side of the rigid spacer; and attachment means, whereby said buffer means, rigid spacer and fender body are assembled together with said buffer means spaced by the rigid spacer a sufficient distance from said outer end of the fender body to allow attainment of increased compression of the fender body upon impact, said rigid spacer further having an outer diameter about equal to or less than the inner diameter of said fender body at its inner end, whereby said rigid spacer may be collapsed to a point adjacent the wharf to attain maximum compression of said fender body upon impact.

13. A fender assembly, as defined in claim 12, wherein said tubular fender body is of circular cross-section.

14. A fender assembly, as defined in claim 12, wherein said outer and inner ends of the fender body have associated therewith reinforcement plates fastener means.

15. A fender assembly as defined in claim 13 wherein the exterior surface of said sidewall has an angle to vertical of from 5° to 20° and the interior surface of said sidewall has an angle to vertical of 5° to 25°.

16. A fender assembly as defined in claim 12 wherein the fender body is substantially frusto-conical in shape.

* * * * *